US009802286B2

(12) United States Patent
Nishi et al.

(10) Patent No.: US 9,802,286 B2
(45) Date of Patent: Oct. 31, 2017

(54) ROBOT CONTROL SYSTEM PROVIDED IN MACHINING SYSTEM INCLUDING ROBOT AND MACHINE TOOL

(75) Inventors: Hiroji Nishi, Minamitsuru-gun (JP); Tetsuaki Kato, Minamitsuru-gun (JP)

(73) Assignee: FANUC LTD, Minamitsuru-gun, Yamanashi (JP)

( * ) Notice: Subject to any disclaimer, the term of this patent is extended or adjusted under 35 U.S.C. 154(b) by 367 days.

(21) Appl. No.: 12/789,530

(22) Filed: May 28, 2010

(65) Prior Publication Data
US 2010/0305758 A1    Dec. 2, 2010

(30) Foreign Application Priority Data
May 29, 2009   (JP) ................................. 2009-130800

(51) Int. Cl.
*G05B 19/409* (2006.01)
*B23Q 17/00* (2006.01)
*G05B 19/418* (2006.01)

(52) U.S. Cl.
CPC ........... *B23Q 17/00* (2013.01); *G05B 19/409* (2013.01); *G05B 19/41825* (2013.01); *Y02P 90/087* (2015.11); *Y02P 90/18* (2015.11)

(58) Field of Classification Search
CPC   B23Q 17/00; G05B 19/41825; G05B 19/409; G05B 2219/45104;
(Continued)

(56) References Cited

U.S. PATENT DOCUMENTS

| 6,374,158 | B1 | 4/2002 | Fusaro, Jr. | |
| 2004/0054439 | A1 | 3/2004 | Morita et al. | |
| 2004/0148058 | A1* | 7/2004 | Johannessen | B25J 13/06 700/245 |
| 2004/0162630 | A1* | 8/2004 | Hillen | G05B 19/042 700/212 |

(Continued)

FOREIGN PATENT DOCUMENTS

| DE | 601 19 186 T2 | 1/2007 |
| EP | 1 085 389 | 5/2004 |

(Continued)

OTHER PUBLICATIONS

Japanese Notice of Reasons for Rejection dated Oct. 5, 2010 issued in Japanese Application No. 2009-103800 (including partial translation thereof).

*Primary Examiner* — Stephen Holwerda
(74) *Attorney, Agent, or Firm* — Drinker Biddle & Reath LLP

(57) ABSTRACT

A robot control system provided in a machining system including a robot and a machine tool. The robot control system includes a robot controller controlling the robot, a portable teach pendant connected to the robot controller, and a communication network adapted to connect the robot controller to a machine tool controller controlling the machine tool. The teach pendant includes a display section configured to display information relating to the robot and the machine tool. The robot controller includes a processing section configured to obtain information relating to the machine tool from the machine tool controller through the communication network, make the display section of the teach pendant display a machine tool-related screen in accordance with a given screen program, and make the machine tool-related screen of the display section of the teach pendant display the information, as obtained, relating to the machine tool.

13 Claims, 7 Drawing Sheets

(58) Field of Classification Search
CPC . G05B 2219/40385; G05B 2219/36404; B25J 9/1664; B05B 19/4083
USPC ...... 33/503; 318/568.11, 587; 700/212, 245, 700/264
See application file for complete search history.

(56) References Cited

U.S. PATENT DOCUMENTS

| | | | | |
|---|---|---|---|---|
| 2004/0232128 | A1* | 11/2004 | Niedereder | B23K 9/1056 219/130.5 |
| 2005/0004707 | A1* | 1/2005 | Kazi | B25J 9/1682 700/245 |
| 2006/0229766 | A1* | 10/2006 | Setsuda | B25J 9/1697 700/245 |
| 2006/0271240 | A1* | 11/2006 | Nihei | B25J 9/1664 700/245 |
| 2006/0276934 | A1* | 12/2006 | Nihei | B25J 9/1656 700/245 |

FOREIGN PATENT DOCUMENTS

| | | |
|---|---|---|
| EP | 1 462 895 A1 | 9/2004 |
| JP | 06/149329 | 5/1994 |
| JP | 06/210582 | 8/1994 |
| JP | 08-036412 | 2/1996 |
| JP | 2001-154717 | 6/2001 |
| JP | 3379115 | 12/2002 |
| JP | 2003-108208 | 4/2003 |
| JP | 2006-343828 | 6/2005 |
| JP | 2008-197856 | 8/2008 |

* cited by examiner

Fig.9

TOOL CORRECTION/SHAPE

| NUMBER | X-AXIS | Y-AXIS | RADIUS | TIP |
|---|---|---|---|---|
| G0001 | 0.000 | 0.000 | 0.000 | 0 |
| G0002 | 0.000 | 0.000 | 0.000 | 0 |
| G0003 | 0.000 | 0.000 | 0.000 | 0 |
| G0004 | 0.000 | 0.000 | 0.000 | 0 |
| G0005 | 0.000 | 0.000 | 0.000 | 0 |
| G0006 | 0.000 | 0.000 | 0.000 | 0 |
| G0007 | 0.000 | 0.000 | 0.000 | 0 |
| G0008 | 0.000 | 0.000 | 0.000 | 0 |

OPERATION

SCREEN | BACK | NEXT | UPDATE | HOME | >

Fig.10

MACHINE OPERATION

CNC1 | PATH | PATH1 | O0004 | N00000

ABSOLUTE COORDINATE
X 0.000
Y 0.000
Z 0.000
A 0.000
B 0.000
C 0.000

MODE
REF | JOG | HDL

OVERRIDE
0% | 25% | 50% | 100%

AXIS SELECTION
1st+ | 2nd+ | 3rd+ | 4th+
1st- | 2nd- | 3rd- | 4th-

NEXT

SCREEN | BACK | NEXT | UPDATE | HOME | >

ROBOT CONTROL SYSTEM PROVIDED IN MACHINING SYSTEM INCLUDING ROBOT AND MACHINE TOOL

BACKGROUND OF THE INVENTION

1. Field of the Invention

The present invention relates to a robot control system provided in a machining system including a robot and a machine tool.

2. Description of the Related Art

In a machining using a machine tool, it is desired to make the machine tool operate for twenty-four consecutive hours in order to raise the operation rate of the machine tool. To this end, it is required that an operator performing operations for feeding an unprocessed workpiece to the machine tool (i.e., a loading operation) and removing a processed workpiece from the machine tool (i.e., an unloading operation) works for a long time. However, a machining job site where the machine tool is used may be in a hostile environment in which droplets of cutting oil used for a machining and chips produced in the machining are suspended. Further, in the operations for feeding and removing the workpiece, carrying a heavy workpiece by a manual-handling or using a crane, etc., is dangerous for the operator. Therefore, instead of making an operator perform loading and unloading operations for a long time, an industrial robot (hereinafter referred simply to as a robot) sometimes performs loading and unloading operations.

A machine tool or a robot, used for a machining, is controlled by a controller. A controller for a typical machine tool, such as a lathe, a machining center, etc., is referred to as a machine tool controller or a CNC (computer numerical control) unit, whereas a controller for a robot is referred to as a robot controller. In a dedicated machine tool designed for a specific application, a PLC (programmable logic controller) may be used as a controller. Such a controller is typically provided with a display and/or a control panel, used by an operator for operating the machine tool or teaching the robot. In the machine tool controller, the display and/or the control panel may be installed fixedly at the front side of the machine tool, so as to allow the operator to visually check a machining condition. On the other hand, in the robot controller, a portable teaching unit or teach pendant, capable of being carried by an operator, may be provided as the display and the control panel. Further, both in the machine tool controller and the robot controller, an object to be displayed on the display of the controller or operated through the control panel of the controller may be limited to the machine tool or robot to be controlled by the controller.

In a machine tool assumed to be used in combination with a robot, it is known that a wall surrounding a working space for a machining is provided with a safety door allowing an operator to enter the inside of the wall and another safety door allowing a robot enter the inside of the wall and perform loading and unloading operations of a workpiece. For example, Japanese Patent No. 3379115 (JP-B-3379115) describes a machine tool provided with a front door allowing an operator to perform certain work and a side door allowing a transfer robot to carry a workpiece in and out, separately with each other.

In the case where a configuration disclosed in JP-B-3379115 is used for a system in which a robot performs loading and unloading operations, it is required to design a new machine tool or modify an existing machine tool in a way as to provide a safety door for an operator and another safety door for allowing a robot to carry a workpiece in and out. On the other hand, even in the case where a robot and a machine tool are used in combination, it is preferable to permit an existing machine tool, designed on the assumption that loading and unloading operations are manually performed, to be used in situ. In this case, a robot feeding and removing a workpiece to and from the inside of a machine tool shares a single safety door with an operator performing certain work on the inside of the machine tool.

In the case where the robot and the machine tool are used in combination, in order to prevent the operating robot from interfering with the operator of the machine tool, it is preferable to place a safety fence surrounding the operating range of the robot. Further, since the operator of the machine tool operates the machine tool at a location where the display and the control panel of the machine tool controller are installed, it is preferable to separate the installation location of the display and the control panel from the operating range of the robot by a safety fence.

However, since the display and the control panel of the machine tool controller may be installed near a safety door so as to permit the operator to visually check the conditions inside the machine tool, it may be difficult to separate the installation location of the display and the control panel from the operating range of the robot by a safety fence. Consequently, the safety fence may be configured to entirely surround the machine tool and the operating range of the robot, so as not to permit the operator to enter the inside of the safety fence during the operation of the robot. In this configuration, in order to check the condition of the machine tool or change the setting of the machine tool during the operation of the robot, the robot is temporarily stopped, and thereafter, the safety fence is opened and the operator manipulates the control panel of the machine tool controller installed inside the safety fence. Further, in order to prevent the robot from moving while the safety fence is opened and the operator manipulates the control panel of the machine tool controller installed inside the safety fence, the system is configured such that a safety plug is provided so as not to permit the safety fence to be closed while the operator is inside the safety fence and an interlock as a safety circuit is provided so as not to permit the robot to start the operation while the safety fence is opened.

In order to perform certain work using the display and/or the control panel of the machine tool controller during the operation of the robot, the robot is first stopped, and then the safety fence is opened and the operator enters the inside of the safety fence to perform the works, which deteriorates working efficiency. Further, in a configuration wherein a single robot performs the loading and unloading operations for a plurality of machine tools, if the robot is stopped and the safety fence is opened for the manipulation of the control panel of any one of machine tool controllers, the loading and unloading operations for the machine tool controlled by another machine tool controller are also stopped. Thus, if the safety fence is frequently opened or closed, the production efficiency of the machine tool will be deteriorated.

One exemplary work performed by an operator using the control panel of the machine tool controller is a work wherein the machining accuracy of a workpiece is determined after a machining is completed and the given parameter of the machine tool is changed based on a determination result. This work is performed, after an event such that a tool is replaced by new one, the lot of unprocessed workpieces is changed, a tooling change is carried out for new workpieces, etc.; at a time when the machining is restarted after a prolonged arrest; every time a predetermined number of machining operations has been performed; and so on. If the machining accuracy of the workpiece after the machining is completed, determined by the operator, does not reach an allowable value, the operator manually inputs correction data in relation to a tool length, a tool diameter or a machining position on the workpiece, set in the machine tool controller, so as to improve the machining accuracy. Alternatively, based on the result of a visual inspection of a machining quality of the machined workpiece, the operator may increase or decrease the rotation speed of a spindle or the feed speed of a tool, so as to improve the machining quality. In order to manipulate the control panel of the machine tool controller inside the safety fence, as described above, the operator temporarily stops the robot, opens the safety fence, manipulates the control pane of the machine tool controller, and thereafter, restarts the operations of the machine tool and the robot, which deteriorates the production efficiency.

Another exemplary work performed by an operator using the control panel of the machine tool controller is a recovery work as being performed at a time when the machine tool stops due to a minor factor. If the display of the machine tool controller is far away from the safety fence and the operator thus cannot visually check the display from the outside of the safety fence, it is difficult to determine whether a malfunction or an alarm (or warning) occurs in the machine tool or not, or whether the machine tool operates normally or not. When the alarm occurs in the machine tool, a tool is first retracted by a retracting operation toward a safe position where the tool does not interfere with a workpiece, the content of the alarm is checked, necessary measures are taken to dissolve a reason for the alarm, and thereafter, the tool is returned to a machining position to restart the machining. However, in the case where the machine tool is stopped due to the minor factor, it may suffice that the alarm is reset and the machining is restarted. It is the cause of a deterioration in working efficiency that, in order to determine the reason for the alarm and control the retracting and returning motion of the tool, the robot is temporarily stopped, the safety fence is opened, the control panel of the machine tool controller is manipulated, and thereafter, the operations of the machine tool and the robot are restarted, every time the machine tool stops, regardless of a reason for the stoppage of the machine tool. Further, another trouble may occur due to, e.g., an operational mistake in the restarting of the robot, and thereby, the stoppage of the machine tool due to the minor factor in nature may lead to the stoppage of the entire system which may take time for a recovery work.

A further exemplary work desired to be performed by an operator using the control panel of the machine tool controller is a work for checking the machining condition of the machine tool. This work is to check the existing machining condition, such as how many cycles of the machining program have been executed, how many percentages of an entire machining process have been completed, etc. Due to this checking work, it is possible to determine the residual necessary machining time and start a setup operation for a subsequent machining. However, opening the safety fence and stopping the robot, in order to perform the checking work, may deteriorate working efficiency.

SUMMARY OF THE INVENTION

The present invention provides, as one aspect, a robot control system provided in a machining system including a robot and a machine tool, which can reduce the need for the stoppage of the operation of the robot due to certain work in connection with the machine tool and can improve working efficiency.

According to one aspect of the present invention, a robot control system comprises a robot controller controlling the robot; a portable teach pendant connected to the robot controller; and a communication network adapted to connect the robot controller to a machine tool controller controlling the machine tool; wherein the teach pendant comprises a display section configured to display information relating to the robot and the machine tool; and wherein the robot controller comprises a processing section configured to obtain information relating to the machine tool from the machine tool controller through the communication network, make the display section of the teach pendant display a machine tool-related screen in accordance with a given screen program, and make the machine tool-related screen of the display section of the teach pendant display the information, as obtained, relating to the machine tool.

In the above robot control system, the robot controller is connected to the machine tool controller through the communication network, and the relating to the machine tool, obtained from the machine tool controller through the communication network, can be displayed on the display section of the portable teach pendant. Therefore, even when the robot and the machine tool are surrounded by a safety fence, an operator can check the information relating to the machine tool by using the portable teach pendant at the outside of the safety fence, so that it is possible to reduce the need for the entrance of the operator inside the safety fence for checking the condition, settings, etc., of the machine tool. Since the operator can check the condition, settings, etc., of the machine tool without entering inside the safety fence, the need for the stoppage of the operation of the robot can be reduced, and working efficiency and/or production efficiency can be improved.

BRIEF DESCRIPTION OF THE DRAWINGS

The objects, features and advantages of the present invention will become more apparent from the following description of the preferred embodiments in connection with the accompanying drawings, wherein:

FIG. 9 is an illustration depicting an example of a tool correction screen displayed on a display of a teach pendant; and FIG. 10 is an illustration depicting an example of a machine operation screen displayed on a display of a teach pendant.

DETAILED DESCRIPTION

Figure 1:
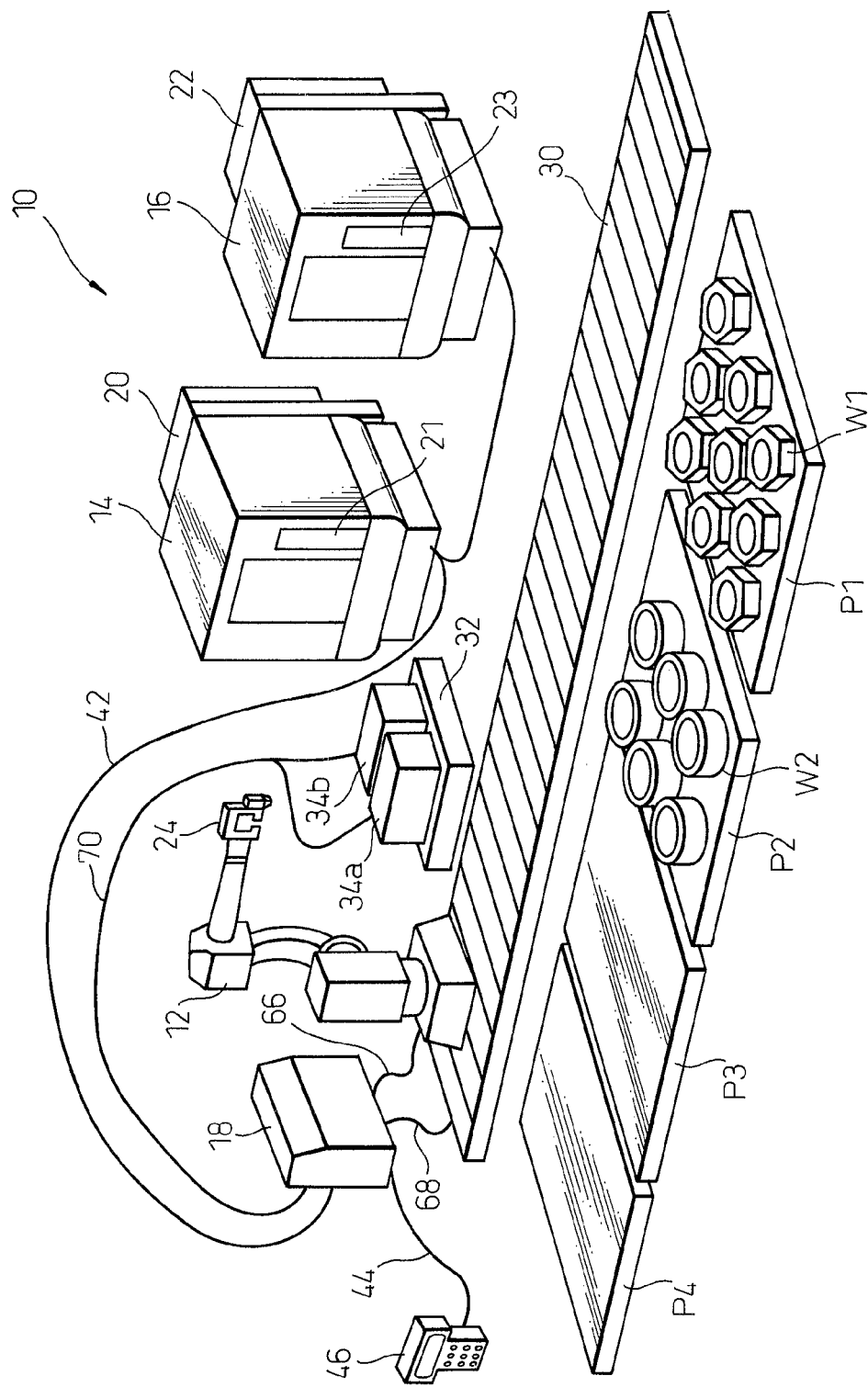
FIG. 1 is an illustration depicting an overall configuration of a machining system, to which a robot control system according to one embodiment of the present invention is applied.

The embodiments of the present invention are described below, in detail, with reference to the accompanying drawings. In the drawings, same or similar components are denoted by common reference numerals.

First, an overall configuration of a machining system 10, to which a robot control system according to one embodiment of the present invention is applied, will be described with reference to FIGS. 1 and 2.

Figure 2:
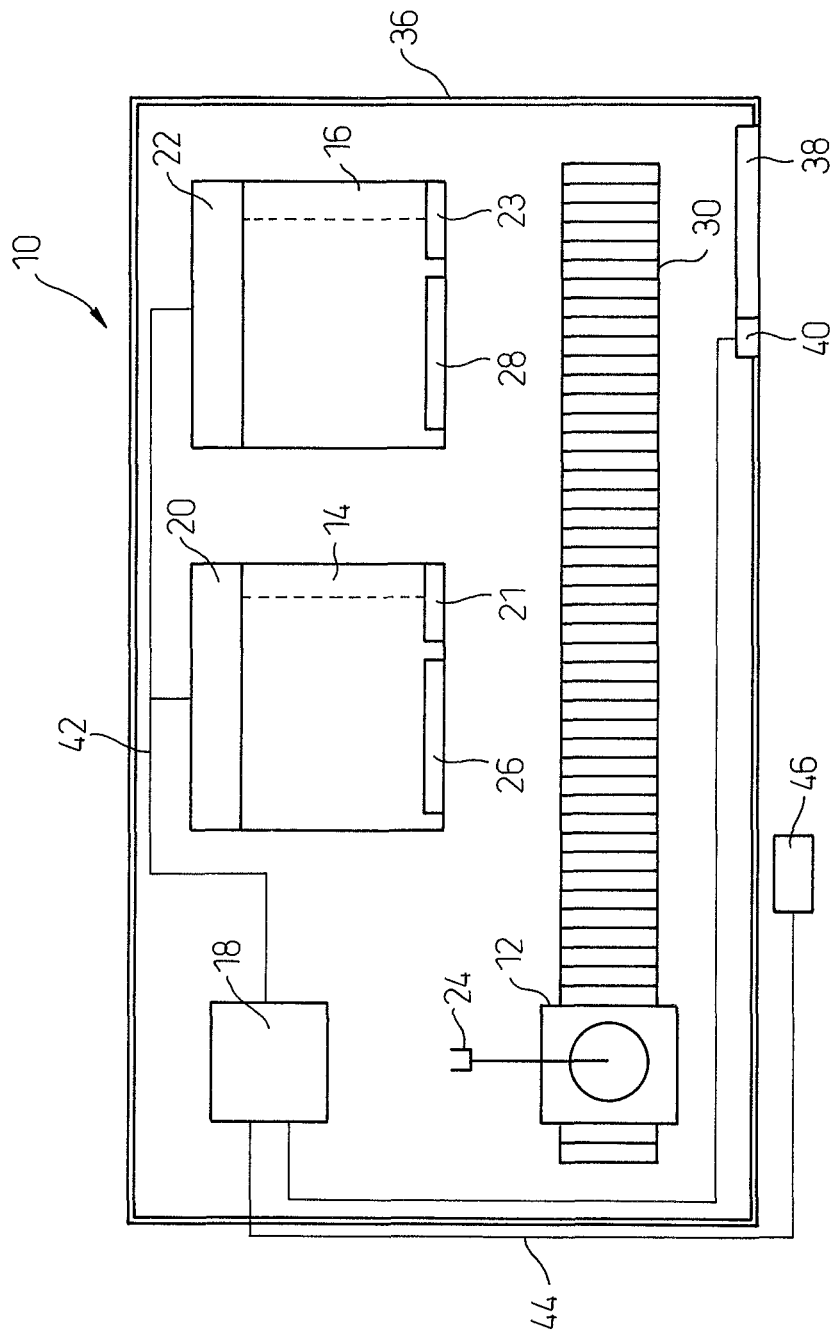
FIG. 2 is a plan view depicting a positional relationship between a machining system and a safety fence.

Referring to FIGS. 1 and 2, a machining system 10 includes a robot 12; a plurality of machine tools 14 and 16; a robot controller 18 for controlling the robot 12; and machine tool controllers 20 and 22 for controlling respectively the machine tools 14 and 16. The mechanical configuration of the robot 12 may have any desired configuration so long as the robot can transfer a workpiece. In the embodiment depicted in FIG. 1, the robot 12 has a mechanical configuration of an articulated robot, and a working tool (or an end effector) 24 is attached to a wrist of the robot 12. Further, in the depicted embodiment, two machine tools 14, 16 are installed. The machine tools 14, 16 are in the form of machining cells. Each of the machine tools 14, 16 includes a spindle (not depicted), a table (not depicted) arranged in front of the spindle, on which a workpiece W1 or W2 is placed, and a wall, such as a splash guard, surrounding circumferentially the spindle and the table, and is configured so that the workpiece W1, W2 is fed and removed through a safety door 26 or 28 provided in the wall. The machine tool controllers 20, 22 are disposed at the back side of the machine tools 14, 16, and control panels 21, 23 for operating the machine tool controllers 20, 22 are provided respectively at the lateral side of the safety doors 26, 28.

A traveling unit 30 defining a traveling axis is installed in front of the machine tools 14, 16, and the robot 12 travels on the traveling unit 30. A plurality of working pallets P1, P2, P3 and P4 are disposed along the traveling unit 30 on the opposite side of the traveling unit 30 from the machine tools 14, 16. In the embodiment depicted in FIG. 1, the workpiece W1 is placed on the working pallet P1, and the workpiece W2 differing in type from the workpiece W1 is placed on the working pallet P2. The pallet P3 is provided for the placement of a machined workpiece W1, and the pallet P4 is provided for the placement of a machined workpiece W2. Further, a provisional table 32 is disposed on the opposite side of the traveling unit 30 from the working pallets P1, P2, P3, P4 and in front of the machine tools 14, 16. A positioning jig 34a for the workpiece W1 and a positioning jig 34b for the workpiece W2 are mounted on the provisional table 32.

The robot controller 18 is connected to the robot 12 and the traveling unit 30 through a robot cable 66 and a traveling unit cable 68, respectively, and thus can control the operations of the robot 12 and the traveling unit 30. Further, the robot controller 18 is connected to the positioning jigs 34a, 34b on the provisional table 32 through a digital signal input/output cable 70.

As depicted in FIG. 2, the machining system 10 is provided with a safety fence 36 surrounding the robot 12 and the machine tools 14, 16. The robot 12 can travel on the traveling unit 30, move to a location in front of each of the machine tools 14, 16, and perform loading and unloading operations. If an operator manipulates the control panel 21, 23 of the machine tool 14, 16 during the operation of the robot 12, the robot 12 may interfere with the operator. In order to prevent the interference between the robot 12 and the operator, the safety fence 36 is installed to surround all of the robot 12, the traveling unit 30 and the machine tools 14, 16. Further, a safety door 38 is provided on the front side of the safety fence 36 for permitting the operator to enter the inside of the safety fence 36, and a safety plug 40 is attached to the safety door 38. In order to open the safety door 38, it is necessary to detach the safety plug 40. When the safety plug 40 is detached, an emergency stop signal is transmitted to the robot controller 18, so as to prevent the robot 12 and the traveling unit 30 from operating.

In the machining system 10, the provision of the safety plug 40 makes it necessary to detach the safety plug 40 from the safety door 38 and open the safety door 38, in order for the operator to manipulate the control panel 21 of the machine tool 14 or the control panel 23 of the machine tool 16. By detaching the safety plug 40, the robot 12 and the traveling unit 30 are brought to an emergency stop. The operator performs certain work inside the safety fence 36 while holding the safety plug 40 detached from the safety door 38 in a hand, so that it is possible to prevent another operator from accidentally closing the safety door 38 and starting the operations of the robot 12 and the traveling unit 30.

In the machining system 10, even if a machining in the machine tool 16 is completed during a time when the operator manipulates the control panel 21 of the machine tool controller 20 of the other machine tool 14, the robot 12 cannot start the loading and unloading operations for the machine tool 16 until the operator finishes manipulating the control panel 21 of the machine tool controller 20 of the machine tool 14 and goes outside the safety fence 36. For example, when an alarm is raised and a machining is stopped in the machine tool 14, the machining in the machine tool 14 can be restarted by manipulating the control panel 21 to perform a recovery work regarding the alarm. However, during the recovery work, the safety plug 40 is detached from the safety door 38 and the robot 12 is thus in an emergency stop condition, so that the loading and unloading operations for the other machine tool 16 cannot be performed. Therefore, it is necessary to make a decision on which of the recovery work of the machine tool 14 in the alarm condition and the continuous machining in the normally operating machine tool 16 should be preferentially performed.

In order to avoid the above situation, in the depicted embodiment, the system is configured in such a way that the robot controller 18 is connected to the machine tool controllers 20, 22 through a network cable 42 and the robot controller 18 is also connected to a portable teaching unit or teach pendant 46 through a teach pendant cable 44 extending from the robot controller 18 installed inside the safety fence 36 to the outside of the safety fence 36, so that the operator can manipulate the teach pendant 46 at the outside of the safety fence 36, as depicted in FIG. 2. As a result, while keeping the safety door 38 closed, it is possible, by using the teach pendant 46, to perform a condition reference, a manipulation and a setting of the robot controller 18 and the machine tool controllers 20, 22 from the outside of the safety fence 36. As the teach pendant cable 44 and the teach pendant 46, the standard accessories of the robot controller 18 can be used. Therefore, the depicted machining system 10 (or the robot control system) can be built only by connecting the robot controller 18 to the machine tool controllers 20, 22 through the network cable 42 constituting a communication network, which can minimize an increase in cost.

The operation of the machining system 10 depicted in FIG. 1 will be described below. In the machining system 10, the robot 12 travels on the traveling unit 30, holds the workpiece W1 on the pallet P1 or the workpiece W2 on the pallet P2 by using the working tool 24, temporarily places the workpiece W1 or W2 on the positioning jig 34*a* or 34*b* on the provisional table 32, and waits for the completion of a machining in each of the machine tools 14, 16. If the machine tool 14 does not perform a machining, the robot 12 holds and transfers the workpiece W1 placed on the positioning jig 34*a* by using the working tool 24, and attaches the workpiece W1 inside the machine tool 14. After the attachment of the workpiece W1 is finished, the robot controller 18 transmits a machining start command to the machine tool controller 20, and the machine tool controller 20 makes the machine tool 14 start the machining of the attached workpiece W1 in accordance with the machining start command. After the machining is completed, the machine tool controller 20 transmits a machining completion signal to the robot controller 18. When the robot controller 18 receives the machining completion signal, the robot 12 removes and transfers the machined workpiece W1 from the machine tool 14 and places it on the pallet P3. Similarly, if the machine tool 14 does not perform a machining, the robot 12 holds and transfers the workpiece W2 placed on the positioning jig 34*b* by using the working tool 24, and attaches the workpiece W2 inside the machine tool 16. After the attachment of the workpiece W2 is finished, the robot controller 18 transmits a machining start command to the machine tool controller 22, and the machine tool controller 22 makes the machine tool 16 start the machining of the attached workpiece W2 in accordance with the machining start command. After the machining is completed, the machine tool controller 22 transmits a machining completion signal to the robot controller 18. When the robot controller 18 receives the machining completion signal, the robot 12 removes and transfers the machined workpiece W2 from the machine tool 16 and places it on the pallet P4.

Figure 3:
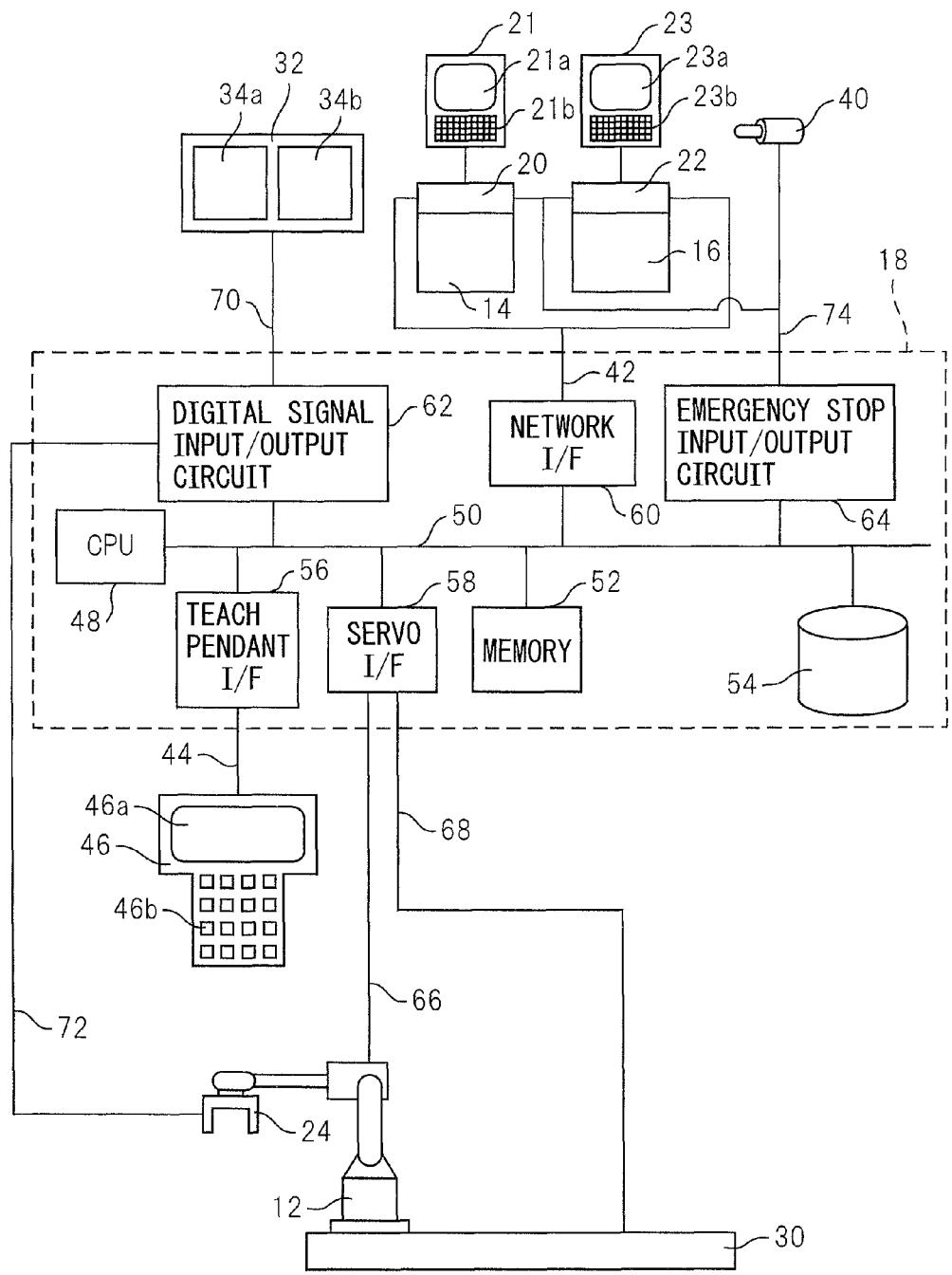
FIG. 3 is a block diagram of the machining system depicted in FIG. 1.

Next, the detail of the robot controller 18 will be described with reference to FIG. 3.

The robot 18 includes a CPU (central processing unit) 48 as a processing section executing various processes as described later. A memory 52, such as a RAM, and a storage unit 54, such as a hard disk, are connected to a bus 50 extending from the CPU 48. The CPU 48 executes various programs stored in the memory 52, and thereby controls the operation of the robot 12. The various programs to be extracted on the memory 52 are saved in the storage unit 54. When the robot controller 18 is powered on, the various programs are read out from the storage unit 54 and extracted on the memory 52, so that the CPU 48 can directly execute the programs saved in the storage unit 54.

The CPU 48 is connected through the bus 50 to a teach pendant interface 56, a servo interface 58 and a network interface 60. The teach pendant interface 56 is connected to the teach pendant 46 through the teach pendant cable 44. The operator can perform a manipulation of the robot controller 18 by using a display 46*a* (a display section) and an input button 46*b* (an input section) provided in the teach pendant 46. The servo interface 58 is connected to the robot 12 through a robot cable 66 and with the traveling unit 30 through a traveling unit cable 68. The robot controller 18 can make respective servo motors of the robot 12 and the traveling unit 30 operate, due to an operation command transmitted through the robot cable 66 and the traveling unit cable 68. The network interface 60 is connected to the machine tool controllers 20, 22 through the network cable 42. Thus, it is possible to perform communication between the robot controller 18 and the machine tool controllers 20, 22 of the respective machine tools 14, 16.

The CPU 48 is further connected through the bus 50 to a digital signal input/output circuit 62 and an emergency stop input/output circuit 64. The digital signal input/output circuit 62 is connected to the positioning jigs 34*a*, 34*b* on the provisional table 32 through a digital signal input/output cable 70, and with the working tool 24 of the robot 12 through a digital signal input/output cable 72. Thus, it is possible to transmit digital signals between the robot controller 18 and the positioning jigs 34*a*, 34*b* and working tool 24. The emergency stop input/output circuit 64 is connected to the machine tool controllers 20, 22 and the safety plug 40 through an emergency stop signal cable 74. When the emergency stop input/output circuit 64 detects an emergency stop signal transmitted from the machine tool controllers 20, 22 and the safety plug 40, the CPU 48 can interrupt electric power to the robot 12 and traveling unit 30, and bring the robot 12 and traveling unit 30 to an emergency stop, through the servo interface 58.

The machine tool controller 20, 22 has a configuration substantially similar to that of the robot controller 18. The machine tool controller 20, 22 is provided with the control panel 21, 23 in place of the teach pendant 46 of the robot controller 18, and an operator can manipulate the machine tool controller 20, 22 by using the display 21*a*, 23*a* and the input button 21*b*, 23*b* of the control panel 21, 23. Other basic configurations of the machine tool controller 20, 22 are substantially identical to those of the robot controller 18, and thus descriptions thereof are not repeated.

Figure 4:
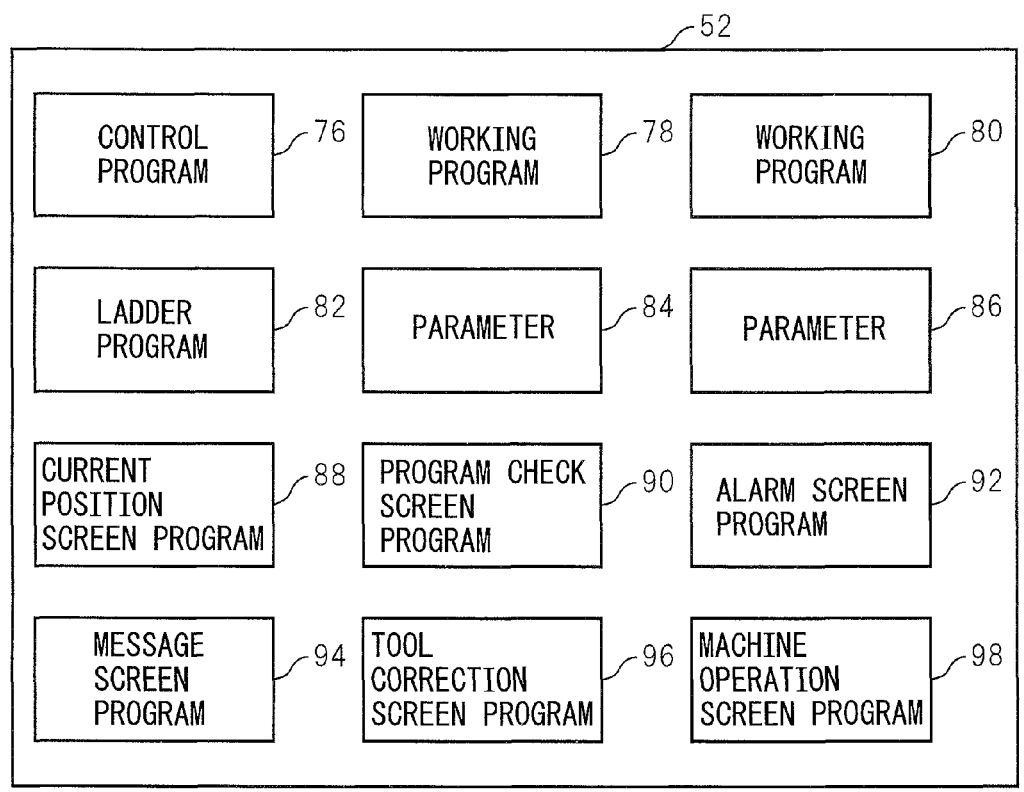
FIG. 4 is an illustration for explaining various programs and parameter information, stored in a memory depicted in FIG. 3.

As depicted in FIG. 4, a control program 76, working programs 78, 80 and a ladder program 82, saved in the storage unit 54, are extracted and stored in the memory 52 of the robot controller 18. The robot controller 18 performs a control operation according to the control program 76. The working program 78 allow the robot 12 to perform an operation for the workpiece W1 by using the working tool 24, and the working program 80 allow the robot 12 to perform an operation for the workpiece W2 by using the working tool 24. The working programs 78, 80 are interpreted by the control program 76 and converted into movements of the robot 12, the working tool 24 and the traveling unit 30. Operation commands from the robot controller 18 to the robot 12 and the traveling unit 30 are transferred through the servo interface 58. The ladder program 82 is a program for inputting/outputting digital signals to/from the working tool 24 and/or the positioning jigs 34*a*, 34*b*. However, the working programs 78, 80 may directly use the digital signal input/output circuit 62 so as to input/output the digital signals.

Further, given parameter information 84 in the machine tool 14 and given parameter information 86 in the machine tool 16 are stored in the memory 52 of the robot controller 18. The given parameter information 84, 86 include the formats and names of the respective control axes of the machine tools 14, 16 (e.g., X-, Y-, Z-, R-axis), the maximum and minimum stroke lengths in each control axis, total number of jig clamps, air blowers or automatic doors, and the like. The given parameter information 84, 86 is obtained by the CPU 48 from each machine tool controller 20, 22 through the network interface 60, and used for preparing various screens for the teach pendant 46 in relation to each machine tool 14, 16.

Still further, various screen programs for the machine tools 14, 16, saved in the storage unit 54, i.e., a current position screen program 88, a program check screen program 90, an alarm screen program 92, a message screen program 94, a tool correction screen program 96 and a machine operation screen program 98, are extracted and stored in the memory 52 of the robot controller 18. The screen programs 88-98 are interpreted by the control program 76, and the CPU 48 makes the display (or display section) 46a of the teach pendant 46 display a machine tool-related screen in accordance with the screen programs 88-98. On the other hand, when an input operation is performed through the input button 46b of the teach pendant 46, the content of the input operation is interpreted through each of the screen programs 88-98. The CPI 48 prepares an operation command by the control program 76 in accordance with the interpreted content of the input operation and transmits the operation command to the machine tool controller 20, 22 of the machine tool 14, 16 through the network interface 60.

If a machine tool-related screen associated with a machine tool is prepared for every type of machine tool, screen preparation man-hours may significantly increase. Therefore, the CPU 48 prepares the machine tool-related screen based on the given parameter information 84, 86 obtained from each machine tool controller 20, 22 through the network interface 60 and stored in the memory 52, in accordance with each of the screen programs 88-98.

Next, examples of the screens prepared according to the screen programs 88 to 98 will be described with reference to FIGS. 5-10. In FIGS. 5-10, screen components having identical functions are denoted by identical reference numerals.

Figure 5:
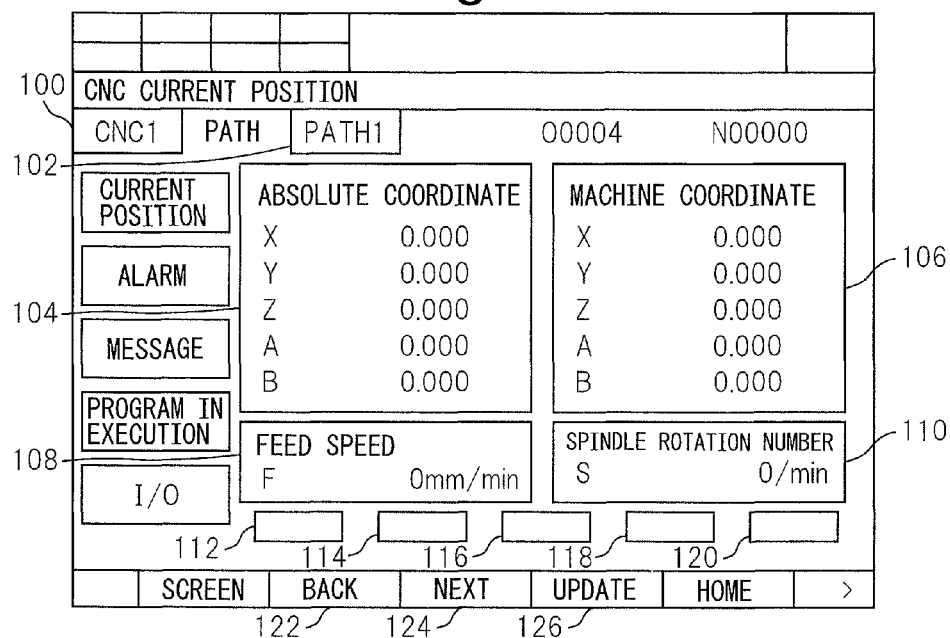
FIG. 5 is an illustration depicting an example of a current position screen displayed on a display of a teach pendant.

FIG. 5 depicts an example of a current position screen displayed on the display (or display section) 46a of the teach pendant 46 in accordance with the current position screen program 88 (FIG. 4). On the current position screen, a CNC selection button (or selecting section) 100, a path selection button 102, an absolute coordinate display area 104, a machine coordinate display area 106, a feed speed display area 108, a spindle rotation number display area 110 and machine tool condition display areas 112-120 are displayed. On the lower region of the current position screen, a previous page indication button 122, a next page indication button 124 and an update/reference mode switching button 126 are displayed. If a touch panel is mounted on the display 46a of the teach pendant 46, an operator can select and press the buttons displayed on the various screens and can input numerical values or characters, by using the touch panel (i.e., another input section of the teach pendant 46). If no touch panel is provided, the operator may perform similar operations by using the input button (or input section) 46b of the teach pendant 46.

The CNC selection button 100 is provided for the selection of one machine tool controller from the machine tool controllers 20 and 22 connected to the robot controller 18 through the network interface 60. When the CNC selection button 100 is pushed, the machine tool controllers 20 and 22 are displayed in the form of a list, so that an operator can select either the machine tool controllers 20 or 22, information about which is to be displayed. When the machine tool controller 20 or 22 is selected, the name of the selected machine tool controller 20 or 22 (in the drawing, "CNC1") is indicated on the CNC selection button 100.

The path selection button 102 is provided for the selection of the number of a path controlled by the machine tool controller 20 or 22 selected by the CNC selection button 100. When the path selection button 102 is pushed, a path-number selection menu is displayed, so that an operator can select one path by the number thereof. When the path is selected, the number of the selected path (in the drawing, "PATH1") is indicated on the path selection button 102. When the machine tool controller 20 or 22 and the path are selected, the CPU 48 (FIG. 3) obtains the maximum number of the control axes belonging to the selected path controlled by the selected machine tool controller 20 or 22, from the machine tool controller 20 or 22 through the network interface 60.

The term "path" means a set of concurrently controlled control axes, among all control axes provided in the machine tool 14, 16. In general, in a machine tool provided with eight control axes, it is a rare case that all of the eight control axes are concurrently controlled. Instead, among the eight control axes, for example, five control axes may be used for controlling the machining operation of a tool, two control axes may be used for controlling the operation of a tool changing turret, and one control axis may be used for controlling a peripheral device. In this case, a path 1 is assigned to the five axes for the machining, a path 2 is assigned to the two axes for the tool changing turret, a path 3 is assigned to the one axis for the peripheral device, and the working programs 78, 80 are prepared for each of the paths. Then, the working programs 78, 80 prepared for two or more paths are concurrently executed, so that, for example, it is possible to simultaneously or concurrently operate the tool changing turret and the peripheral device, during the machining by using the tool. The control axes in different paths do not operate in association with each other, and therefore, the aforementioned configuration, in which the current positions of the control axes belonging to the selected path are displayed on the current position screen but control axes belonging unselected path are not displayed, is convenient for the operator.

When the machine tool controller 20 or 22 and the path are selected, the CPU 48 obtains the current positions of the respective control axes belonging to the selected path in the selected machine tool controller 20 or 22, from the selected machine tool controller 20 or 22 through the network interface 60. Then, the CPU 48 makes the absolute coordinate display area 104 display the current positions in an absolute coordinate system in a manner as to be related to the names of the respective control axes belonging to the selected path in the selected machine tool controller 20 or 22, and makes the machine coordinate display area 106 display the current positions in a machine coordinate system in a manner as to be related to the names of the respective control axes belonging to the selected path in the selected machine tool controller 20 or 22. The names of the respective control axes (in the drawing, X, Y, Z, A, B) in the absolute coordinate display area 104 and the machine coordinate display area 106 may be obtained from the selected machine tool controller 20 or 22 through the network interface 60, at the same time as obtaining the current positions. However, the names of all of the control axes may be obtained in advance.

The absolute coordinate display area 104 and the machine coordinate display area 106 are updated at regular intervals. When any one of the control axes provided in the machine tool 14, 16 operates, the current position of the corresponding control axis displayed in the absolute coordinate display area 104 and the machine coordinate display area 106 is changed in real time. In the depicted embodiment, it is possible to display the current positions of five control axes in each of the absolute coordinate display area 104 and the machine coordinate display area 106. If the machine tool 14, 16 is provided with six or more control axes, the current positions of those control axes are displayed in several pages. When the previous page indication button 122 or the next page indication button 124 is pushed, the current positions of the preceding or succeeding five axes can be displayed.

When the machine tool controller 20 or 22 is selected, the CPU 48 also obtains a feed speed and a spindle rotation number, as well as the indicative units thereof, set for a machining carried out in the corresponding machine tool 14 or 16, from the selected machine tool controller 20 or 22 through the network interface 60. Then, the CPU 48 makes the feed speed display area 108 display the current feed speed controlled by the selected machine tool controller 20 or 22, and makes the spindle rotation number display area 110 display the current spindle rotation number controlled by the selected machine tool controller 20 or 22. The feed speed display area 108 and the spindle rotation number display area 110 are updated at regular intervals, and display the feed speed and the spindle rotation number in real time. The indicative units of the feed speed and the spindle rotation number are obtained from the machine tool controller 20, 22 as described above. Typically, the unit of the feed speed is indicated as "mm/min", and the unit of the spindle rotation number is indicated as "/min". However, "mm/sec", "cm/min", etc., may be used as the unit of the feed speed, and "/sec", "/msec", etc., may be used as the unit of the spindle rotation number.

When the machine tool controller 20 or 22 is selected, the CPU 48 further obtains the operating condition of the corresponding machine tool 14 or 16, from the selected machine tool controller 20 or 22 through the network interface 60. Then, the CPU 48 makes the machine tool condition display areas 112-120 display the operating condition of the machine tool 14, 16. In the depicted example, an operational mode, a state of an automatic operation, a state of an axis motion, an executing state of an auxiliary function, and a state of an alarm, are obtained as machine tool conditions.

The machine tool condition display area 112 displays, as the obtained operational mode of the machine tool 14, 16, any one of "MDI": a manual data input operation (or a MDI operation), "MEM": an automatic operation according to a program stored in the memory (or a memory operation), "RMT": an automatic operation performed while reading a programs from an outside through an interface (or a DNC operation), "EDIT": a memory editing, "HDL": a manual handle feed, "JOG": a jog feed, "INC": a manual incremental feed, "REF": a manual reference point return, and "*": others. The machine tool condition display area 114 displays, as the obtained state of the automatic operation of the machine tool 14, 16, any one of "*": a reset state, "STOP": an automatic operation stopping state, "HOLD": an automatic operation pausing state, "STRT": an automatic operation starting state, "MSTR": a manual numerical command starting state. The machine tool condition display area 116 displays, as the obtained state of the axis motion of the machine tool 14, 16, any one of "MTN": an axis motion running state, and "DWL": a dwell state (a state where a function for delaying a transition to a next block operation for an instructed time period). The machine tool condition display area 118 displays, as the executing state of the auxiliary functions of the machine tool 14, 16, any one of "FIN": an auxiliary functions running state, and "*": others. The machine tool condition display area 120 displays, as the obtained state of the alarm of the machine tool 14, 16, any one of "ALM": an alarm occurring state, "BAT": a voltage reduction in a lithium battery, and "*": others.

The update/reference mode switching button 126 is provided for switching the mode of the current position screen between an update mode and a reference mode. An operator can select either one of the update mode and the reference mode by pushing the update/reference mode switching button 126, and the selected mode is indicated on the update/reference mode switching button 126. When the reference mode is selected and the update/reference mode switching button 126 indicates "Reference", the internal data of the selected machine tool controller 20 or 22 is not changed, even if the operator performs any manipulation on the current position screen. Therefore, the internal data is not affected by erroneous operation, which ensures safety. On the other hand, when the update mode is selected and the update/reference mode switching button 126 indicates "Update", it is possible to manipulate to change the data displayed in the feed speed display area 108, the spindle rotation number display area 110 and the machine tool condition display areas 112-120. More specifically, when the operator pushes and selects an area desired to be subjected to a data change, from among the feed speed display area 108, the spindle rotation number display area 110 and the machine tool condition display areas 112-120, the operator is prompted to input new data corresponding to the selected area. When new data is input by using the input button 46b of the teach pendant 16, the new data is transmitted to the selected machine tool controller 20 or 22 through the network interface 60 and the internal data of the machine tool controller 20 or 22 is changed. Even when the machine tool controller 20, 22 receives the new data, the machine tool controller 20, 22 may be configured not to change the internal data thereof, if the new data is inappropriate, such as data exceeding an allowable range.

As described above, in the current position screen, the operator can select a desired machine tool controller 20 or 22 by using the CNC selection button 100, from among the machine tool controllers 20, 22 connected to the robot controller 18 through the network interface 60 and network cable 42. The CPU 48 obtains information such as the configurations and/or names of the control axes provided in each machine tool 14, 16, from the selected machine tool controllers 20 or 22 through the network interface 60, and makes the current position screen display the obtained information. Therefore, it is not necessary to prepare current position screens for the respective types of the machine tools 14, 16.

Figure 6:
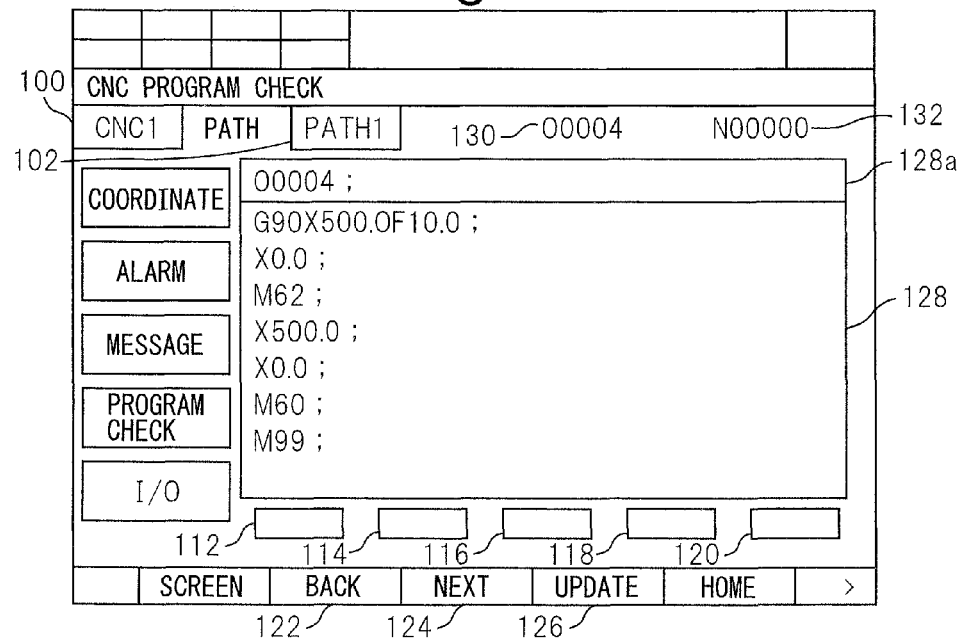
FIG. 6 is an illustration depicting an example of a program check screen displayed on a display of a teach pendant.

FIG. 6 depicts an example of a program check screen displayed on the display 46a of the teach pendant 46 in accordance with the program check screen program 90 (FIG. 4). On the program check screen, similarly to the current position screen, a CNC selection button 100, a path selection button 102, machine tool condition display areas 112-120, a previous page indication button 122, a next page indication button 124 and an update/reference mode switching button 126 are displayed. In addition, an executed program line display area 128, an executed program number display area 130 and an executed program line number display area 132 are further displayed on the program check screen.

The CPU 48 makes the executed program line display area 128 display a content of a machining program that is being executed by the selected machine tool controller 20 or 22, the content being obtained by the CPU 48 from the machine tool controller 20 or 22 through the network interface 60. In this connection, a line currently executed in the machining program (hereinafter referred to as an executed line) is highlighted by an execution cursor 128a. The executed program line display area 128 is provided with a display space for eight lines, and total eight program lines including the executed line are displayed therein. In order to display another program line, the displaying page may be switched by pushing the previous page indication button 122 or the next page indication button 124.

The CPU 48 makes the executed program number display area 130 display a program number assigned to the machining program that is being executed by the selected machine tool controller 20 or 22, the program number being obtained by the CPU 48 from the machine tool controller 20 or 22 through the network interface 60. The program number of the machining program carried out by the machine tool 14, 16 can be represented by, for example, the combination of a Roman character "O" and a subsequent four-digit number.

The CPU 48 makes the executed program line number display area 132 display a number of an executed line in the machining program that is being executed by the selected machine tool controller 20 or 22, the number being obtained by the CPU 48 from the machine tool controller 20 or 22 through the network interface 60. The number of the executed line in the machining program carried out by the machine tool 14, 16 can be represented by, for example, the combination of a Roman character "N" and a subsequent four-digit number.

The machine tool controller 20, 22 may read program lines in the machining program ahead of an actual execution. Therefore, at a time when an alarm occurs, the execution cursor 128a may highlight a line ahead of the program line (or the executed line) actually executed by the machine tool controller 20, 22. In this case, in the executed program line display area 128, the read-ahead line is indicated and highlighted by a color different from that of the other lines. Thus, when the execution of the machining program is restarted after the alarm occurs, it is required to set back the execution cursor 128a from the read-ahead line to the actually executed line before restarting. In the program check screen, at a time when the reference mode is switched to the update mode by the update/reference mode switching button 126, the operator can shift the execution cursor 128a indicated in the executed program line display area 128 to the desired program line. Then, by pushing the update/reference mode switching button to switch from the update mode to the reference mode, the CPU 48 can transmit a parameter representing the position of the executed line to the selected machine tool controller 20 or 22 through the network interface 60. Thus, after the alarm occurs, the machine tool controller 20 or 22 can restart the execution of the machining program, from the actually executed line different from the line highlighted by the execution cursor 128a at a time when the alarm occurs.

Figure 7:
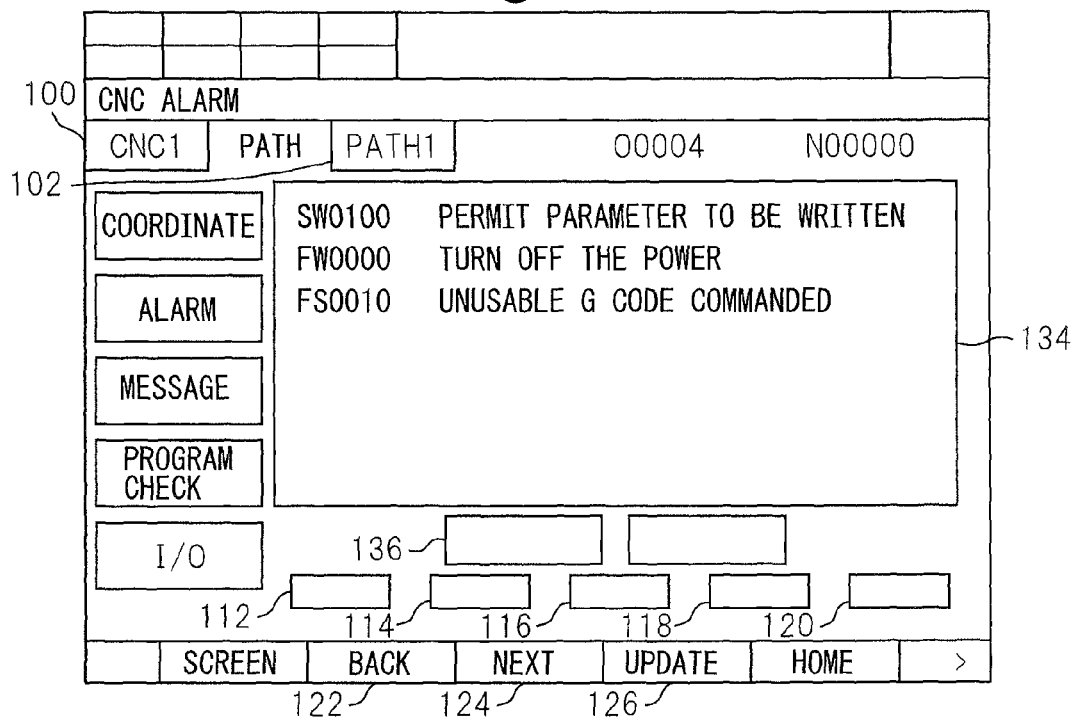
FIG. 7 is an illustration depicting an example of an alarm screen displayed on a display of a teach pendant.

FIG. 7 depicts an example of an alarm screen displayed on the display 46a of the teach pendant 46 in accordance with the alarm screen program 92 (FIG. 4). On the alarm screen, similarly to the current position screen, a CNC selection button 100, a path selection button 102, machine tool condition display areas 112-120, a previous page indication button 122, a next page indication button 124 and an update/reference mode switching button 126 are displayed. In addition, an occurring alarm display area 134 and an alarm reset button 136 are further displayed on the alarm screen.

The CPU 48 obtains the details of all alarms occurring in the selected machine tool controller 20 or 22 from the machine tool controller 20 or 22 through the network interface 60, and makes the occurring alarm display area 134 display the details of the alarms. When the operator pushes the alarm reset button 136, the CPU 48 transmits a reset command to the selected machine tool controller 20 or 22 through the network interface 60. The machine tool controller 20 or 22 deactivates all alarms and newly detects an alarm occurring at the time. In this connection, the machine tool controller 20, 22 does not detect the already detected alarm again, but can additionally detect only the newly occurring alarm. By pushing the alarm reset button 136 so as to issue the reset command to the machine tool controller 20 or 22, all of the detected alarms are deactivated, and all alarms are newly detected.

Figure 8:
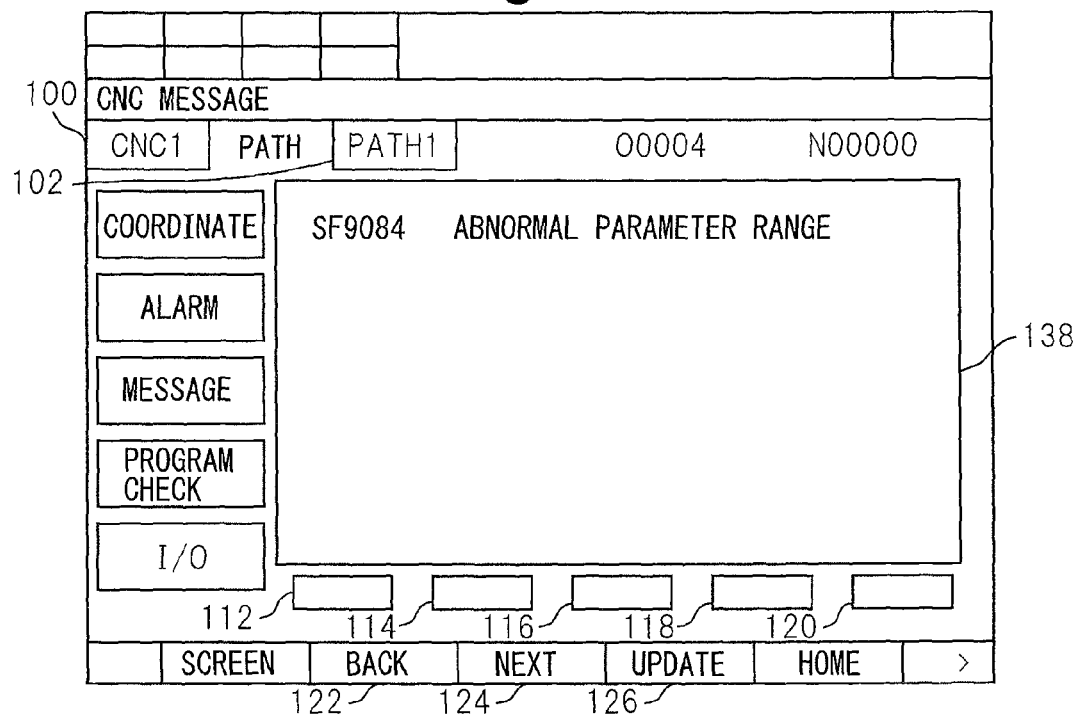
FIG. 8 is an illustration depicting an example of an operator message screen displayed on a display of a teach pendant.

FIG. 8 depicts an example of an operator message screen displayed on the display 46a of the teach pendant 46 in accordance with the message screen program 94 (FIG. 4). On the operator message screen, similarly to the current position screen, a CNC selection button 100, a path selection button 102, machine tool condition display areas 112-120, a previous page indication button 122, a next page indication button 124 and an update/reference mode switching button 126 are displayed. In addition, an operator message display area 138 is further displayed on the operator message screen. The CPU 48 obtains the details of the operator messages other than the alarm occurring in the selected machine tool controller 20 or 22, from the machine tool controller 20 or 22 through the network interface 60, and makes the operator message display area 138 display the details of the operator messages.

FIG. 9 depicts an example of a tool correction screen displayed on the display 46a of the teach pendant 46 in accordance with the tool correction screen program 96 (FIG. 4). On the lower region of the tool correction screen, similarly to the lower region of the current position screen, a previous page indication button 122, a next page; indication button 124 and an update/reference mode switching button 126 are displayed. On the upper region of the tool correction screen, a tool correction number 140, a tool correction x-axis offset 142, a tool correction y-axis offset 144 and a tool correction radius offset 146 are displayed respectively in the form of a listing.

The CPU 48 obtains tool correction numbers set in the selected machine tool controller 20 or 22, as well as tool correction x-axis offset amounts, tool correction y-axis offset amounts and tool correction radius offset amounts, corresponding to the tool correction numbers, from the machine tool controller 20 or 22 through the network interface 60, and makes the tool correction screen display the obtained data as the tool correction number 140, the tool correction x-axis offset 142, the tool correction y-axis offset 144 and the tool correction radius offset 146, respectively. When the operator pushes the update/reference mode switching button 126 to switch from the reference mode to the update mode and selects any one of the tool correction numbers, a tool correction value input screen is displayed on the tool correction screen. The CPU 48 transmits a setting command of a tool correction value, input by the operator in the tool correction value input screen, to the selected machine tool controller 20 or 22 through the network interface 60.

Even when the machine tool controller 20, 22 receives the setting command of the tool correction value, the machine tool controller 20, 22 may be configured to ignore the setting command of the tool correction value and not to change the tool correction value, if it is not desired to change the tool correction value in accordance with the setting command in the presently selected operational mode of the machine tool 14, 16, or if the transmitted tool correction value exceeds an allowable range.

FIG. 10 depicts an example of a machine operation screen displayed on the display 46a of the teach pendant 46 in accordance with the machine operation screen program 98 (FIG. 4). The machine operation screen is provided for the operator to operate the respective control axes of the machine tool 14, 16 by using the teach pendant 46. On the machine operation screen, similarly to the current position screen, a CNC selection button 100, a path selection button 102 and an absolute coordinate display area 104 are displayed. In addition, a machine tool condition change button 148, an override selection change button 150, an axis selection button 152 and an axis-selection next page indication button 154 are displayed on the machine operation screen. By using these buttons, it is possible to perform the switching of an operational mode necessary for manually moving the control axis provided in the machine tool 14, 16, the selection of an override value used for adjusting the moving speed of the control axis provided in the machine tool 14, 16, and the selection of the control axis to be actually moved. The override value is previously set, for the temporary change of the moving speed of the control axis defined in the machining program, etc., so as to permit the actual moving speed of the control axis to be changed without changing the numerical value of the defined moving speed. By multiplying the defined moving speed by a ratio (%) previously set as the override value, the moving speed of the control axis can be changed.

The machine tool condition change button 148 is provided for permitting a current operational mode of the machine tool 14 or 16 corresponding to the selected machine tool controller 20 or 22 to be displayed and changed, and includes a REF button representing a manual reference point return mode, a JOG button representing a jog feed mode, and a HDL button representing a manual handle feed mode. When the operator pushes one of these buttons on the machine operation screen, the CPU 48 transmits an operational mode switching command to the selected machine tool controller 20 or 22 through the network interface 60. As a result, the operational mode of the machine tool 14 or 16 is switched.

The override selection change button 150 is provided for permitting a current override value set in the selected machine tool controller 20 or 22 to be displayed and changed, and includes a 0% button, a 25% button, a 50% button and a 100% button. When the operator pushes one of these buttons on the machine operation screen, the CPU 48 transmits an override change command to the selected machine tool controller 20 or 22 through the network interface 60. As a result, the override value is changed.

The axis selection button 152 is provided for permitting buttons corresponding to the respective control axes included in the machine tool 14 or 16 controlled by the selected machine tool controller 20 or 22 to be displayed and selected. The CPU 48 obtains information about the configurations and/or names of the control axes controlled by all machine tool controllers 20, 22 through the network interface 60, and displays the information in the axis selection button 152. In the axis selection button 152, the buttons corresponding to four control axes are displayed in such a way so as to permit a plus (forward) moving direction and a minus (reverse) moving direction of the axes to be selected. If the machine tool 14 or 16 includes five or more control axes, the axis-selection next page indication button 154 is pushed so as to permit the number of the control axes displayed on the axis selection button 152 to be changed.

The operator can select the control axis to be moved and the moving direction thereof, by pushing any one of the buttons in the axis selection button 152 on the machine operation screen. Further, the operator can move one axis of the machine tool 14 or 16, by pushing a machine tool axis moving button provided in the input button 46b of the teach pendant 46. More specifically, when the operator pushes the machine tool axis moving button in the input button 46b of the teach pendant 46 in the state where he continuously pushes any one of the buttons in the axis selection button 152, the CPU 48 transmits an axis move command for the control axis selected in the axis selection button 152 to the selected machine tool controller 20 or 22 through the network interface 60. The machine tool controller 20 or 22 makes the control axis selected in the axis selection button 152 move at a speed based on the override value selected in the override selection change button 150, in accordance with the transmitted axis move command. On the other hand, when the operator releases the machine tool axis moving button in the input button 46b of the teach pendant 46, the CPU 48 transmits an axis stop command for the control axis selected in the axis selection button 152 to the selected machine tool controller 20 or 22 through the network interface 60. The machine tool controller 20 or 22 makes the movement of the control axis selected in the axis selection button 152 stop in accordance with the transmitted axis stop command.

The absolute coordinate display area 104 displays a current position of the control axis selected in the axis selection button 152 in an absolute coordinate system. During a time when the selected machine tool controller 20 or 22 moves the control axis of the corresponding machine tool 14 or 16, the current position of the control axis displayed in the absolute coordinate display area 104 is changed accordingly. Therefore, the operator can easily check the moving state of the control axis, by referring the value displayed in the absolute coordinate display area 104.

Even when the machine tool controller 20, 22 receives the axis move command, the machine tool controller 20 or 22 may be configured to ignore the axis move command and not to move the control axis by judging that the axis movement cannot be permitted, if it is not desired to move the control axis in accordance with the axis move command in the selected operational mode of the machine tool 14, 16, if an alarm occurs in the machine tool 14, 16, or if the axis move command exceeds an operating range of the control axis of the machine tool 14, 16. Consequently, in the case where it is not desired to move the control axis in the machine tool 14 or 16, the axis movement is not performed and safety can be ensured.

In the machining system 10 (or the robot control system) according to the depicted embodiment, the teach pendant 46 can be used for operating the robot 12 and/or the traveling unit 30 and checking the condition of the robot 12 and/or changing the settings of the robot 12, through the robot controller 18, and also for operating the control axes of the machine tools 14, 16 and checking the conditions of the machine tools 14, 16 and/or changing the settings of the machine tools 14, 16, through the machine tool controllers 20, 22 connected to the robot controller 18 through the network cable 42. Therefore, the operator can perform the condition check, operation and setting of the robot 12, as well as the condition check, operation and setting of the machine tools 14, 16, by using the single teach pendant 46, so that working efficiency is improved. Further, the operator, who is present on the outside of the safety fence 36 depicted in FIG. 2, can operate all of the control axes provided in the machining system depicted in FIG. 1, through the teach pendant 46 provided on the outside of the safety fence 36, so that the control axes are safely operated.

Further, the robot controller 18 is configured to detect, through the network, the machine tool controllers 20, 22 connected to the robot controller 18 by the network cable 42, obtains the information relating to the machine tool 14 or 16, such as the configuration of the control axis, the name of the control axis, the current position of the control axis, etc., from the machine tool controller 20 or 22 selected by using the teach pendant 46, and make the display 46a of the teach pendant 46 display various screens relating to the operation of the selected machine tool controller 20 or 22, based on the obtained information. Therefore, it is not necessary to prepare various screens for the respective types of the machine tools. Further, when the machine tool 14, 16 stops due to an alarm, the operator can check the reason for the alarm and perform a recovery work, by using the teach pendant 46 at the outside of the safety fence 36. Therefore, it is not necessary to stop the robot 18 due to the operation relating to the machine tool 14, 16, and the machining system can be safely and quickly recovered after the stoppage due to the alarm. Further, the operator can adjust the tool correction value by using the teach pendant 46 at the outside of the safety fence 36, so that the operator can safely perform a tool correction, based on the machining accuracy of a workpiece measured after the machining is completed, and easily improve the machining accuracy.

While the robot control system according to one aspect of the present invention has been described based on the depicted embodiment, the present invention is not limited to the configuration of the depicted embodiment. For example, although, in the depicted embodiment, the robot controller 18 is connected to the machine tool controllers 20, 22 through the network cable 42, the robot controller 18 and the machine tool controllers 20 and 22 may be connected to each other by any communication networks, such as a wireless communication network. Further, the robot control system according to one aspect of the present invention may be applied to a machining system including a single machine tool (and thus a single machine tool controller) or at lease three machine tools (and thus at least three machine tool controllers).

Various aspects of the present invention will be recited below.

A robot control system includes a robot controller controlling the robot, a portable teach pendant connected to the robot controller, and a communication network adapted to connect the robot controller to a machine tool controller controlling the machine tool. The teach pendant includes a display section configured to display information relating to the robot and the machine tool. The robot controller includes a processing section configured to obtain information relating to the machine tool from the machine tool controller through the communication network, make the display section of the teach pendant display a machine tool-related screen in accordance with a given screen program, and make the machine tool-related screen of the display section of the teach pendant display the information, as obtained, relating to the machine tool.

In the above robot control system, the robot controller is connected to the machine tool controller through the communication network, and the relating to the machine tool, obtained from the machine tool controller through the communication network, can be displayed on the display section of the portable teach pendant. Therefore, even when the robot and the machine tool are surrounded by a safety fence, an operator can check the information relating to the machine tool by using the portable teach pendant at the outside of the safety fence, so that it is possible to reduce the need for the entrance of the operator inside the safety fence for checking the condition, settings, etc., of the machine tool. Since the operator can check the condition, settings, etc., of the machine tool without entering inside the safety fence, the need for the stoppage of the operation of the robot can be reduced, and working efficiency and/or production efficiency can be improved.

The processing section of the robot controller may be configured to process an input operation onto the machine tool-related screen of the display section of the teach pendant, and transmit a content of the input operation to the machine tool controller through the communication network. Due to the configuration where the content of the input operation on the machine tool-related screen of the teach pendant is transmitted to the machine tool controller, it is possible to operate the machine tool controller by using the teach pendant. Therefore, even when the robot and the machine tool are surrounded by the safety fence, the operator can operate the machine tool controller by using the portable teach pendant on the outside of the safety fence, so that it is possible to reduce the need for the entrance of the operator inside the safety fence for the operation and/or the setting change of the machine tool.

The robot controller may be configured to be connected through the communication network to a plurality of machine tool controllers respectively controlling different machine tools. In this configuration, the processing section may be configured to detect the plurality of machine tool controllers connected through the communication network to the robot controller, make the machine tool-related screen of the display section of the teach pendant display a selecting section provided for a selection of a desired machine tool controller from among the plurality of machine tool controllers, and make the machine tool-related screen display the information obtained from the desired machine tool controller selected by the selecting section.

The processing section of the robot controller may be configured to obtain given parameter information of the machine tool controlled by the desired machine tool controller selected by the selecting section, from the desired machine tool controller through the communication network, and prepare the machine tool-related screen based on the given parameter information as obtained.

The processing section of the robot controller may be configured to obtain a position of a control axis of the machine tool from the machine tool controller through the communication network, and make the machine tool-related screen of the display section of the teach pendant display the position of the control axis as obtained.

The processing section of the robot controller may be configured to obtain a name of the control axis of the machine tool from the machine tool controller, and make the machine tool-related screen display the name of the control axis as obtained, as being related to the position of the control axis.

The processing section of the robot controller may be configured to obtain a feed speed and a spindle rotation number of the machine tool from the machine tool controller through the communication network, and make the machine tool-related screen of the display section of the teach pendant display the feed speed and the spindle rotation number as obtained.

The processing section of the robot controller may be configured to obtain an operational mode of the machine tool from the machine tool controller through the communication network, and make the machine tool-related screen of the display section of the teach pendant display the operational mode as obtained.

The processing section of the robot controller may be configured to obtain a machining program executed in the machine tool controller, from the machine tool controller through the communication network, and make the machine tool-related screen of the display section of the teach pendant display the machining program as obtained.

The processing section of the robot controller may be configured, when an alarm occurs in the machine tool, to obtain information of the alarm from the machine tool controller through the communication network, and make the machine tool-related screen of the display section of the teach pendant display the information of the alarm as obtained.

The processing section of the robot controller may be configured to transmit an operation command to the machine tool controller, based on the input operation onto the machine tool-related screen of the display section of the teach pendant.

The processing section of the robot controller may be configured to transmit commands for setting and changing a parameter relating to the machine tool, based on the input operation onto the machine tool-related screen of the display section of the teach pendant. The parameter relating to the machine tool may be at least one of a feed speed, a spindle rotation number, an operational mode, a position of an executed line in an executed machining program, and a tool correction value, set in the machine tool.

While the invention has been described with reference to specific preferred embodiments, it will be understood, by those skilled in the art, that various changes or modifications may be made thereto without departing from the scope of the following claims.

The invention claimed is:

1. A robot controller controlling a robot, the robot performing loading and unloading of a workpiece relative to a plurality of machine tools controlled by a plurality of machine tool controllers, respectively, wherein the plurality of machine tool controllers are disposed separately from the robot controller and do not control the robot, each machine tool controller configured to control operation of the corresponding machine tool;

wherein the robot controller is connected to a portable teach pendant used for operating the robot controller, and is also connected to the plurality of machine tool controllers through a communication network;

wherein said teach pendant comprises a display section configured to display information of the plurality of machine tools;

wherein said robot controller is configured to obtain information of the plurality of machine tools from the corresponding machine tool controllers through said communication network, make said display section of said teach pendant display a machine tool-related screen including a CNC selection button, and make said machine tool-related screen of said display section of said teach pendant display the information of the plurality of machine tools, such that a machine tool controller of the plurality of the machine tool controllers can be selected by the CNC selection button displayed on the display section of the teach pendant, and information of the selected machine tool corresponding to the selected machine tool controller is presented in the teach pendant display;

wherein, when an input operation is performed on said machine tool-related screen of said display section of said teach pendant, said robot controller is configured to transmit a content of said input operation to the selected machine tool controller through said communication network; and wherein said robot controller is configured to enable the selected machine tool controller to be operated by said input operation performed on said machine tool-related screen.

2. The robot controller of claim 1, wherein said robot controller is configured to detect at least one of the plurality of machine tool controllers connectable through said communication network, make said machine tool-related screen of said display section of said teach pendant display a selecting section for the selection of the selected machine tool controller from among the plurality of machine tool controllers, and make said machine tool-related screen display said information obtained from the selected machine tool controller corresponding to the selected machine tool.

3. The robot controller of claim 2, wherein said robot controller is configured to obtain parameter information of the selected machine tool controlled by the selected machine tool controller, from the selected machine tool controller through said communication network, and prepare said machine tool-related screen dedicated to the selected machine tool based on said parameter information as obtained.

4. The robot controller of claim 1, wherein said robot controller is configured to obtain a position of a control axis of the selected machine tool from the selected machine tool controller through said communication network, and make said machine tool-related screen of said display section of said teach pendant display said position of the control axis.

5. The robot controller of claim 4, wherein said robot controller is configured to obtain a name of the control axis of the selected machine tool from the selected machine tool controller, and make said machine tool-related screen display said name of the control axis, as being related to said position of the control axis.

6. The robot controller of claim 1, wherein said robot controller is configured to obtain a feed speed and a spindle rotation number of the selected machine tool from the selected machine tool controller through said communication network, and make said machine tool-related screen of said display section of said teach pendant display said feed speed and said spindle rotation number.

7. The robot controller of claim 1, wherein said robot controller is configured to obtain an operational mode of the selected machine tool from the selected machine tool controller through said communication network, and make said machine tool-related screen of said display section of said teach pendant display said operational mode.

8. The robot controller of claim 1, wherein said robot controller is configured to obtain a machining program executed in the selected machine tool controller, from the selected machine tool controller through said communication network, and make said machine tool-related screen of said display section of said teach pendant display said machining program.

9. The robot controller of claim 1, wherein, when a machine tool from the plurality of machine tools generates an alarm, said robot controller is configured to obtain information of the alarm from the corresponding machine tool controller through said communication network, and make said machine tool-related screen of said display section of said teach pendant display said information of the alarm.

10. The robot controller of claim 1, wherein said robot controller further comprises:
   a processing section configured to obtain said information relating to the selected machine tool controller of the selected machine tool, make said display section of said teach pendant display said machine tool-related screen that is dedicated to the selected machine tool, and make said machine tool-related screen of said display section of said teach pendant display said information.

11. The robot controller of claim 1, wherein said information displayed by said display section relate to the robot and the selected machine tool.

12. A robot controller controlling a robot, the robot performing loading and unloading of a workpiece relative to a plurality of machine tools controlled by a plurality of machine tool controllers, respectively, wherein the plurality of machine tool controllers are disposed separately from the robot controller and do not control the robot, each machine tool controller configured to control operation of the corresponding machine tool;
   wherein the robot controller is connected to a portable teach pendant used for operating the robot controller, and is also connected to the plurality of machine tool controllers through a communication network;
   wherein said teach pendant comprises a display section configured to display information of the plurality of machine tools;
   wherein said robot controller is configured to obtain information of the plurality of machine tools from the corresponding machine tool controllers through said communication network, make said display section of said teach pendant display a machine tool-related screen including a CNC selection button, and make said machine tool-related screen of said display section of said teach pendant display the information of the plurality of machine tools, such that a machine tool controller of the plurality of machine tool controllers can be selected by the CNC selection button displayed on the display section of the teach pendant, and information of the selected machine tool corresponding to the selected machine tool controller is presented in the teach pendant display;
   wherein, when an input operation is performed on said machine tool-related screen of said display section of said teach pendant, said robot controller is configured to transmit a content of said input operation to the selected machine tool controller through said communication network; and
   wherein said robot controller is configured to enable a parameter relating to the selected machine tool to be set and changed by said input operation performed on said machine tool-related screen.

13. The robot controller of claim 12, wherein said parameter relating to the selected machine tool is at least one of a feed speed, a spindle rotation number, an operational mode, a position of an executed line in an executed machining program, and a tool correction value, set in the selected machine tool.

* * * * *